(12) United States Patent
Teets

(10) Patent No.: US 8,701,416 B2
(45) Date of Patent: Apr. 22, 2014

(54) RADIALLY STAGED RQL COMBUSTOR WITH TANGENTIAL FUEL-AIR PREMIXERS

(76) Inventor: Joseph Michael Teets, Hobe Sound, FL (US)

( * ) Notice: Subject to any disclaimer, the term of this patent is extended or adjusted under 35 U.S.C. 154(b) by 1484 days.

(21) Appl. No.: 11/820,427

(22) Filed: Jun. 19, 2007

(65) Prior Publication Data

US 2008/0041059 A1 Feb. 21, 2008

Related U.S. Application Data

(60) Provisional application No. 60/816,404, filed on Jun. 26, 2006.

(51) Int. Cl.
*F02C 1/02* (2006.01)

(52) U.S. Cl.
USPC .................................. 60/754; 60/732; 431/10

(58) Field of Classification Search
USPC ........ 60/752, 753, 754, 732; 431/12, 10, 200, 431/201
See application file for complete search history.

(56) References Cited

U.S. PATENT DOCUMENTS

| | | |
|---|---|---|
| 3,645,095 A | 2/1972 | Melconian |
| 3,738,106 A | 6/1973 | Stein |
| 4,040,251 A | 8/1977 | Heitmann |
| 4,151,709 A | 5/1979 | Melconian |
| 4,545,196 A | 10/1985 | Mongia |
| 4,549,402 A | 10/1985 | Saintsbury |
| 4,702,073 A | 10/1987 | Melconian |
| 4,787,208 A | 11/1988 | DeCorso |
| 4,794,754 A | 1/1989 | Shekleton |
| 4,928,479 A | 5/1990 | Shekleton |
| 4,949,545 A | 8/1990 | Shekleton |
| 4,982,570 A | 1/1991 | Waslo |
| 4,996,838 A | 3/1991 | Melconian |
| 5,025,622 A | 6/1991 | Melconian |
| 5,054,284 A | 10/1991 | Shekleton |
| 5,058,375 A | 10/1991 | Shekelton |
| 5,129,222 A | 7/1992 | Lampe |
| 5,163,284 A * | 11/1992 | Shekleton ....................... 60/804 |
| 5,172,546 A | 12/1992 | Shekleton |
| 5,207,055 A | 5/1993 | Shekleton |
| 5,209,066 A * | 5/1993 | Barbier et al. .................. 60/732 |
| 5,303,543 A | 4/1994 | Shah |
| 5,363,644 A | 11/1994 | Shekleton |
| 5,456,080 A * | 10/1995 | Shekleton ....................... 60/804 |
| 5,685,156 A | 11/1997 | Willis |
| 5,746,048 A | 5/1998 | Shah |
| 5,850,732 A | 12/1998 | Willis |
| 5,894,720 A | 4/1999 | Willis |
| 5,950,417 A | 9/1999 | Robertson |
| 5,966,926 A | 10/1999 | Shekleton |
| 5,996,351 A | 12/1999 | Feitelberg |
| 6,016,658 A | 1/2000 | Willis |
| 6,497,103 B2 | 12/2002 | Johnson |
| 6,698,208 B2 | 3/2004 | Teets |
| 6,845,621 B2 | 1/2005 | Teets |

* cited by examiner

*Primary Examiner* — Andrew Nguyen
(74) *Attorney, Agent, or Firm* — Daniel S. Polley, P.A.

(57) ABSTRACT

A double annular radially staged combustor for a gas turbine engine having a reduced internal flow transitioning area between an outboard primary combustion zone and al inboard secondary combustion zone. The primary combustion zone is an annular shell form with a radially inboard annular exit. An outboard ring with thru holes and an inboard annular channel yields a quick quench zone. The secondary combustion zone, adjacent to and downstream of the quick quench zone is of an annular shell form, generally radially inboard of the primary combustion zone. In a preferred embodiment the secondary combustion zone exiting hot gases flows into a dilution zone prior to exiting the combustor.

11 Claims, 4 Drawing Sheets

SECTION AA

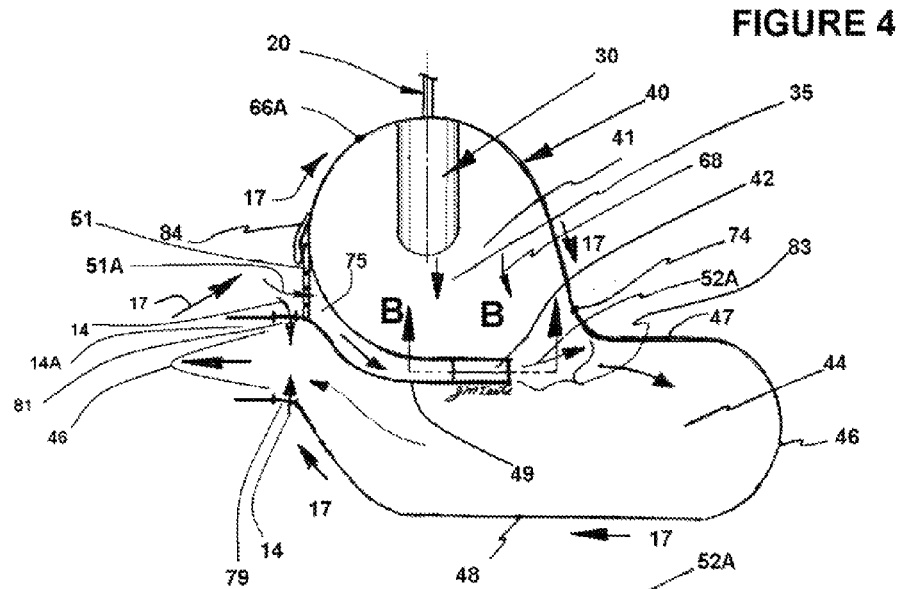
FIGURE 4
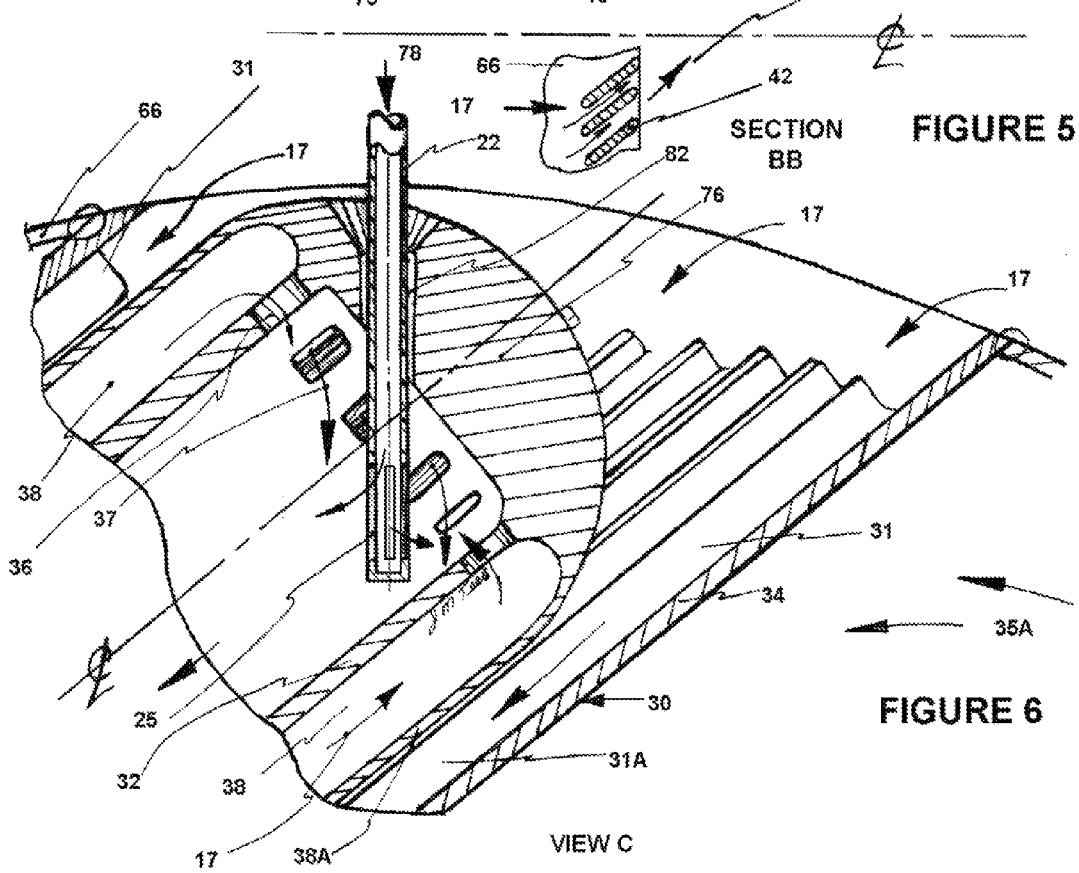
FIGURE 5
FIGURE 6

RADIALLY STAGED RQL COMBUSTOR WITH TANGENTIAL FUEL-AIR PREMIXERS

This application claims benefit of the provisional application Ser. No. 60/816,404 filed Jun. 26, 2006.

BACKGROUND OF THE INVENTION

1. Field of the Invention

This invention relates generally to RQL combustors and more specifically it relates to a radially staged RQL combustor with tangential fuel premixers as an internal combustion energy means for a gas turbine engine to yield low emissions, good flame stability, uniform flame front, mulifuel use including low BTU gas, and good flame stability at any power setting.

2. Description of Prior Art

It can be appreciated that RQL combustors have been in use for years. Typically, low emissions combustors used in gas turbine engines for Dry Low Emissions (DLE) and are either Lean Premixed Prevaporized (LPP) type or Rich burn-Quick quench-Lean burn (RQL) type using liquid or gaseous fuels; the combustors operate with a continuous flame and incorporate fuel nozzle assemblies to accept and premix amounts of regulated deliver fuel and air to yield a flammable mixture for the heat energy means to drive the gas turbine rotor spool. Features of a good combustor include: flame stability, low emissions, little or no soot, and high combustion efficiency over a wide range of engine power requirements and operating engines rotational speeds.

The main challenge with a combustor is controlling combustion flame temperature which by most part dictates emissions species levels of NOx (oxides of nitrogen, NO+NO2), CO (carbon monoxide) and UHC (unburned hydrocarbons). Conventional combustors of today for gas turbine engines have flame temperatures between ~1340 F and 4050 F (dependant on fuel type); the lower flame temperature yields low NOx but excessive CO, UHC and the higher flame temperatures yield both low CO and UHC but higher flame temperatures yielding excessive NOx. Acceptable low levels of these emissions species could be found between flame temperatures operating range of ~2400 F and 2800 F in a air rich, lean combustion F/A ratio environment. To attain this approximate narrow band of flame temperatures, variable geometry means to the air supply could be incorporated but would add complexity in hardware control methods and maintenance yielding an increase of cost. Of the various means of variable geometry for a LPP combustor system, would be one in which large quantities of engine air are admitted at the upstream end of the combustion liner at maximum power conditions to lower the primary-zone temperature thru lean F/A mixtures. With reduction in engine power, an increasing proportion of the air would be diverted to the downstream dilution zone to maintain a lean F/A mixture within the low emissions (NOx, CO, UHC) flame temperature window/range. U.S. Pat. Nos. 5,894,720 and 5,966,926 LPP type combustors offer low emission at high end power level and incorporates staged premix fuel/air nozzles to assist in the reduction of emission at off design power or reduced power requirements and aide in the combustion flame stability, but too lean of a F/A ratio would cause combustor flame extinction. The fuel/air premix nozzles of these noted LPP patents are positioned in the forward end of the combustor and direct pre-combustor exiting combusted gases into an annular combustor liner in a tangential direction for flame dispersion and stabilization assist. The fuel/air premix nozzles, incorporate combustor liner expansion means for the engine body fixed nozzle assemblies. Another means of reduced emissions thru LPP combustor design is seen in the ABB EV burner noted in ASME 99-GT-21B publication.

This offers low emissions over a wide range of power requirements and incorporates a pilot fuel nozzle system to assure flame stability of the LPP flame at off design, reduced engine power conditions and during transient power operation.

Another issue with conventional combustors are fuel nozzle premix systems, the fuel/air mixtures prior to combustion ideally should be homogeneous, features of good mixedness; and concerning liquid fuels, a vaporization process to yield a gaseous state would be helpful to enhance mixedness in the F/A mixing process. Whittle in early years of gas turbines—1936 attempted to use fuel delivery in tubes within the combustor to vaporize fuel prior to combustion but had inner tube wall carbon issue. Rolls Royce, Curtis-Wright, Avco Lycoming, Snecma and Williams to name a few have successfully incorporated premix vaporizer tubes in gas turbine engines with different ranges of F/A mixture prior to combustion some rich enough not to support combustion with the premix tubes. Most use clean Jet fuels, and diesel type fuels have a propensity not only also to have cause coke between –283 F to 800 F like Jet fuels but at higher temperatures, ash deposits will be an issue if the fuel nozzle geometry is not designed properly. Another problem with conventional RQL type combustors with the primary zone rich F/A combustion and lean secondary combustion zone is the need to have good mixedness prior to combustion but less sensitive than the LPP combustor. Also, in the secondary combustion zone (RQL) a uniform quick quench mixing premix process of the rich oxidizing primary flame for the lean stage secondary flame is necessary having continuous fluid flow uninterrupted thru the secondary zone chamber with no stagnation area and or no F/A leanings stray air injection to add NOx. Rizk and Mongia in a 1992 paper on RQL combustors noted equivalence ratios (ER=actual F/A ratio divided by the F/A ratio of the unique fuel level stoichiometry) in the primary zone of 1.2 to 2.5 and tested and included liquid (limited <1.6) and gaseous fuels F/A ratio was highest at maximum power and was limited to avoid any hard carbon and subsequent turbine ingestion issue. The secondary mixing area of the can combustor (like U.S. Pat. No. 4,787,208 without variable geometry) had a typical reduced area to assist mixing of the jetted supply air for immediate leaning of the supplied rich flame primary oxidizing stage flame (typically high radiant red for diesel type fuel and dark blue for gaseous fuels). The highest flame temperature is ~@stoichiometry level with decreasing flame temperature as the F/A mixture is richened or leaned. The desire (ER) equivalence ratio for the secondary zone is ~0.6 to ~0.45. Variable geometry was experimented with in all zones (primary, secondary, and dilution) in the Rizk and Mongia efforts. In the U.S. Pat. No. 4,996,838 of 1991 (RQL type) combustor idea considered variable residence time vortex with liner wall louvers in the annular combustor and a reduced geometry between the primary and secondary chambers and radially opposing air jets for secondary air supply/mixing was incorporated. The AIAA 92-3471 in 1992 reflected some test results including ~1.77 equivalence ratio (ER) in the primary zone and 0.6 (ER) in the secondary zone. The louvers most likely were added to rid liner wall carbon (wall stagnation flow and or raw fuel onto the liner wall yielding hard carbon) and with this added leaning air in the rich primary zone elevated NOx would ensue. June 1992 of Mechanical Engineering Magazine engine testing of a RQL liner using coal having a rich flame primary zone flame of ER ~1.77 (~3000 F) and the secondary flame was water quenched to ~2000 F to help rid the coal ash along with low NOx. The U.S. Pat. No. 4,702,073 describes a vortex combustion process type can combustor having a reduced geometry section between the primary and secondary chambers having channel vanes of opposing air jets to continue to drive a vortex process, was especially helpful in collection of ash particles being radially outboard and duct out of the engine. U.S. Pat. No. 5,363,644 depicts a sidewinder combustor annular design and could be used as an RQL application but limited in use. The primary zone with circumferential tangent tube for fuel air premix supply, as nozzles would have F/A unmixedness at high power levels yielding pockets of elevated flame temperature, and the louvers/internal plates added would yield elevated flames temperature pockets if a rich F/A mixture was adjacent to the louvers. The second row of tangent air supply tubes downstream continue the combustion leaning process; but if air in injected into the supplied rich primary flame the mixedness locally would be less than uniform and yield resultant elevated flame temperatures and subsequent higher levels of NOx emissions. This patent is an upgrade from the conventional combustors to a RQL type. U.S. Pat. No. 6,845,621 a RQL combustor, having an initial design thru empirical methods, offers good low emissions with gaseous fuel; and with the incorporation of U.S. Pat. No. 6,698,208 atomizing fuel nozzles, reduced emissions using liquid fuel could be exhibited thru improved F/A premix mixedness in the primary zone but needs a higher delta P across the combustor liner for atomizing/vaporizing as that of gaseous fuel. Analytics show the combustor could yield single digit NOx levels and CO simultaneously. Although the secondary air of supply in U.S. Pat. No. 6,845,621 yields a good quench zone having reduced area in the form of radial dams with radial opposing air supply jets axially located between the primary zone and secondary combustion chambers—the areas, downstream of and adjacent to the dam wall secondary side having stagnation areas and also in the primary zone side if injection of secondary air is possible low NOx levels will be compromised.

In these respects, the Radially Staged RQL Combustor with Tangential Fuel Premixers according to the present invention substantially departs from the conventional concepts and design of prior art, and in so doing provides an apparatus primarily developed for the purpose of providing an internal combustion energy device for a gas turbine engine to yield low emissions, high durability, multifuel use including low BTU gas and good flame stability at any power setting and or engine operating speed.

SUMMARY OF THE INVENTION

In view of the foregoing disadvantages inherent in the known types of RQL combustors now present in the prior art, the present invention provides a new radially staged RQL combustor with tangential Fuel/Air premix chambers wherein the same can be utilized for providing a internal combustion energy device for a gas turbine engine to yield low emission, reduced cost, improved durability, mulifuel use including low BTU gas—bio fuels, good flame stability at any power settings and ease of starting. The general purpose of the present invention, which will be described subsequently in greater detail, is to provide a new radially staged RQL combustor with tangential fuel/air premix chambers that has many novel features and result in a new radially staged RQL combustor which is not anticipated, rendered obvious, suggested, or even implied by any of the prior art, either alone or in any combination thereof.

To attain this, the present invention generally comprises a combustor assembly, having a primary combustion zone, secondary air supply area, a reduced combustor flow area for secondary air supply fuel/air premixing, a secondary combustion zone, a dilution air supply area, a dilution zone, fuel injector assemblies, and a tangential supply primary zone located fuel vaporizer—Fuel/Air premix chambers. A Rich burn-Quick quench-Lean burn (RQL) combustor having a toroidal form primary combustion zone with tangential F/A premix-vaporizers system and in general is radially outboard the secondary combustion chamber. The Fuel/Air premix-vaporizer system is a F/A premix chamber having an elongated tubular form, attached to the outboard primary combustion chamber, receives fuel and air within and premixes a rich combustible mixture and discharges the mixture tangential with velocity into the primary combustion zone. The fuel injector is tubular form, is flange attached to the engine body, and with free length is insertable in the premix inner chamber for delivery of jetted liquid fuel or gaseous type.

There has thus been outlined, rather broadly, the more important features of the invention in order that the detailed description thereof my be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a radially staged RQL combustor scheme with tangential fuel/air premix chambers that will overcome the shortcomings of the prior art devices.

An object of the present invention is to provide a an internal combustion energy device for a gas turbine engine to yield low emissions, reduced cost, high durability, multifuel use, good flame stability at any power or engine speed setting.

Another object is to provide a radially staged RQL combustor with tangential fuel premixers that improves RQL combustion means, to yield low emission, high combustion efficiency, high turn down ration capability and has good flame stability throughout the gas turbine engine operating range of engine airflow and engine spool rotational speeds. Another object is to provide a radially staged RQL combustor with tangential fuel/air premixers that improves fuel vaporizing means prior to combustion in the primary combustion zone and yield a homogeneous F/A mixture within and yield premix chamber exit flow resultant in a tangential circumferential flow in the primary zone. Another object is to provide a geometry form in the primary/secondary combustion chambers to lend smooth continuous thru flow without flow disruption, stagnation areas and minimal structural and or thermal stresses.

Another object is to provide a F/A premixing chamber to rid potential coke formation on the fuel fluid film dispersion wall either thru temperature control and or material selection. Also the premix chambers fluid residence time increase for improved homogenous F/A mixing is considered with geometry/length and internal swirl velocity. Ceramic material chamber could be incorporated to rid any material reaction with the fuel to rid propensity of attachment such as coke or ash issues.

Another object is to provide a radially staged RQL combustor with tangential Fuel/Air premix chamber having low pressure fuel injection either thru liquid fuel use jetted wall thin film dispersion or injector wall axially slotted thru cavities to allow low pressure gas dispersion within the primary premix chamber to improve F/A mixing prior to combustion.

Another object is to provide a radially staged RQL combustor with tangential fuel vaporizers-Fuel/Air premix chambers that improves combustor design where the primary combustion zone incorporates a toroidal circumferential flow to keep unburned fuel outboard of the radially inboard primary zone exit flow to the secondary zone; where the radially inboard axial aft exiting primary zone flame flow interests with the secondary air flow from at least one predominantly axial direction and the radially out board shell wall of the secondary combustion zone to create a combustor flow circumferentially and aft or a combination flow direction. The circumferential primary combustion zone fluid flow and or secondary combustion zone not only could assure unburned fuel being outboard due to higher density and giving more residence time for combustion but a circumferential duct could be incorporated as a means of ash collection in the case of pulverized coal fuel (example) and at scheduled intervals combustor pressure could be used to eject overboard this collected ash.

Other objects and advantages of the present invention will become obvious to the reader and it is intended that these objects and advantages are within the scope of the present invention.

To the accomplishment of the aforementioned and related objects, this invention may be embodied in the form illustrated in the accompanying drawings, attention being called to the fact, however, that the drawing are illustrative only, and that changes my be made in the specific construction illustrated.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 4. ¼ cross sectional view of the RQL combustor assembly with one secondary air supply source.

FIG. 5. Partial cross section of secondary air supply angled vane channels.

FIG. 6. Partial cross section of a tangential fuel/air premix chamber with a gaseous fuel injector.

DESCRIPTION OF THE PREFERRED EMBODIMENT

Figure 1:
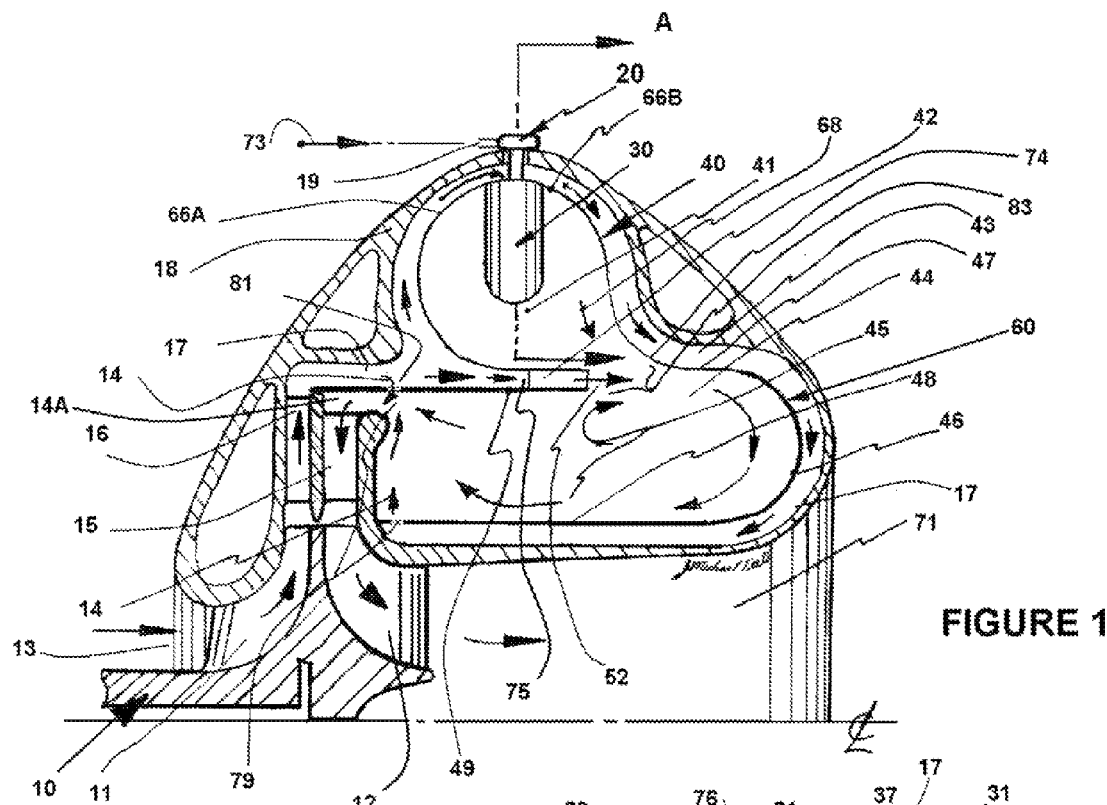
FIG. 1. ¼ cross-section side view, RQL combustor assembly within an engine body.
Figure 2:
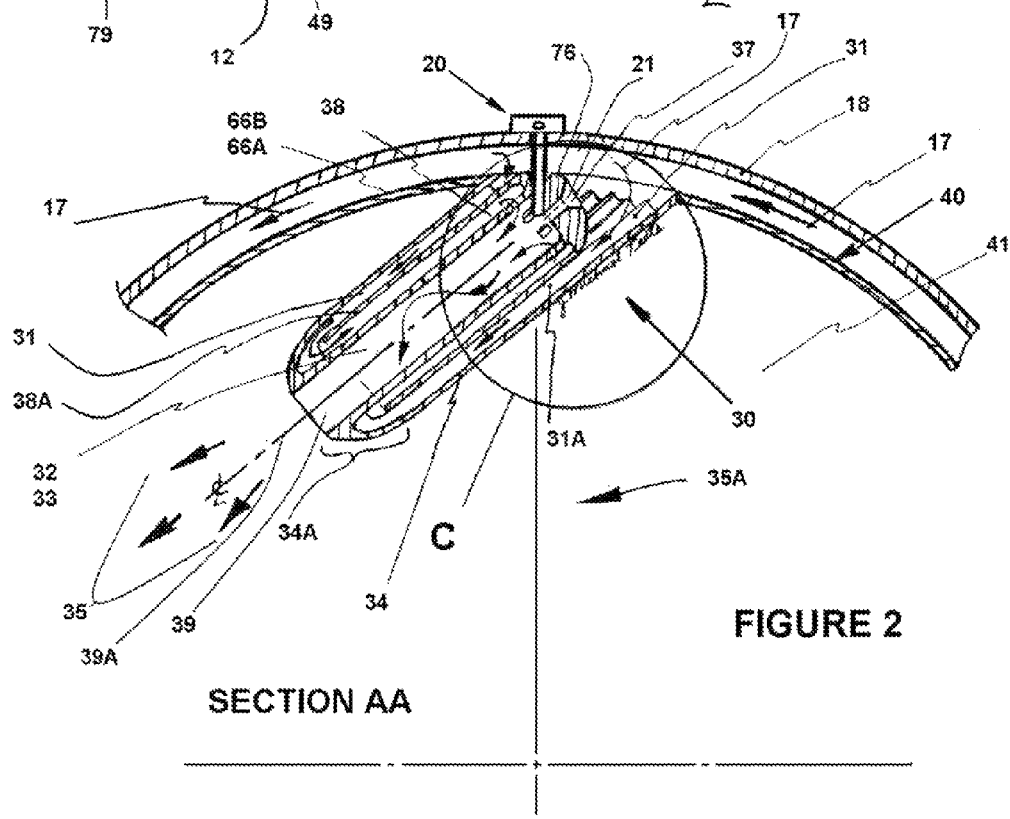
FIG. 2. Section AA, partial cross section view, RQL combustor with tangential fuel/air premix chamber with liquid fuel injector.

Turning now descriptively to the drawings, in which similar reference characters denote similar elements throughout the several views, the attached figures illustrate a radially staged RQL combustor assembly with tangential fuel/air premix chambers, and comprise of: a primary combustion zone with fuel injection means, tangentially oriented fuel/air premix chamber assemblies, a secondary air supply area, a reduced combustor flow area that receives secondary air supply for lean primary zone hot gas leaning, a secondary combustion zone, a dilution air supply area and a dilution zone.

This Rich burn-Quick quench-Lean burn (RQL) combustor invention having a toroidal geometry primary combustion zone with tangential fuel/air (F/A) premix chambers is generally positioned radially outboard of the secondary combustion zone. The F/A premix chamber 30 is a longitudinally elongated tubular form assembly with an outer tube 34 having internal cooling means 31 and a co-axial inboard fluid turning end 34A and the air 17 entrance end cap 76 end located to the outer circumferential shell position of the primary combustion chamber 66. The F/A premix chamber assembly 30, outer tube 34 is exposed to the primary zone flame heat, receives fuel 78 and air 17 within and f/a premixes a rich combustible mixture and discharges 35, with a differential combustor liner pressure, into the primary combustion zone tangentially therein. To avoid premix chamber entrance carbon at the fuel injection discharge into the tube 32 inboard cap 76 area, the air delivery 17 to the premix inboard tube chamber ID 32, an air preheating means via a counter flow heat exchanger means is incorporated. Primary premix f/a air flow 17 supply begins about the end cap 76 outboard entrance of channel 31A area between the inboard surface of outer tube 34, having cooling fins 31 to remove heat from tube 34 [+] and end form 34A. The heating of air 17 continues to the end of the outer tube 34 and turns inboard at the 34A end wall then flows aft in the channel 38 formed between inner tube 32 outer wall (could have fins to help heat the inner vaporized tube wall) and the mid tube 38A inner wall, ducting premixing air 17 to and thru tangent air holes 36 to yield inner swirl 37. The end cap 76 inboard side begins the fuel/air mixing area. The air supply channels 36 can be elongated longitudinally axially extend the length of the tube 32 or additionally incorporate more circumferential planer hole rows downstream toward the exiting tube end 39 to assure premixing fuel/air mixture. In the case of liquid fuel, a end cap 76 hole 37 can be incorporated to prevent fuel stagnation about the end of the fuel injector 23A exit wall to rid potential coking during operation and or shutdown. The F/A premix chambers 30 receive jetted fuel 21 such to impart a force for wall 32 tube ID fuel dispersion resultant thin layer of fuel to vaporize, as in the case of liquid fuels. The radial positioned injector receiver hole 82 is incorporated to allow free thermal radial expansion of the combustor liner 66 about the injector longitudinal form and also retain the insertable inner tube sub assembly 32-76-38A. The inner tube 32 cavity where the F/A premixing is done, the length design considers f/a residence time and the cross-section flow area design such to impart an exiting velocity 35 from tube exit area 39 creating a circumferential toroidal flow 35A.

The created circumferential tangent primary zone flow 35A assists in keeping any raw unburned fuel outboard and away from the primary zone exit area 68 until combusted. For ease of assembly, reduced cost and simplicity the, tube 32 end cap 76 and mid tube 38A as a subassembly is longitudinally, co-axially insertable into the outer tube 34 with end form 34A having one end attached to the liner shell 66.

Figure 7:
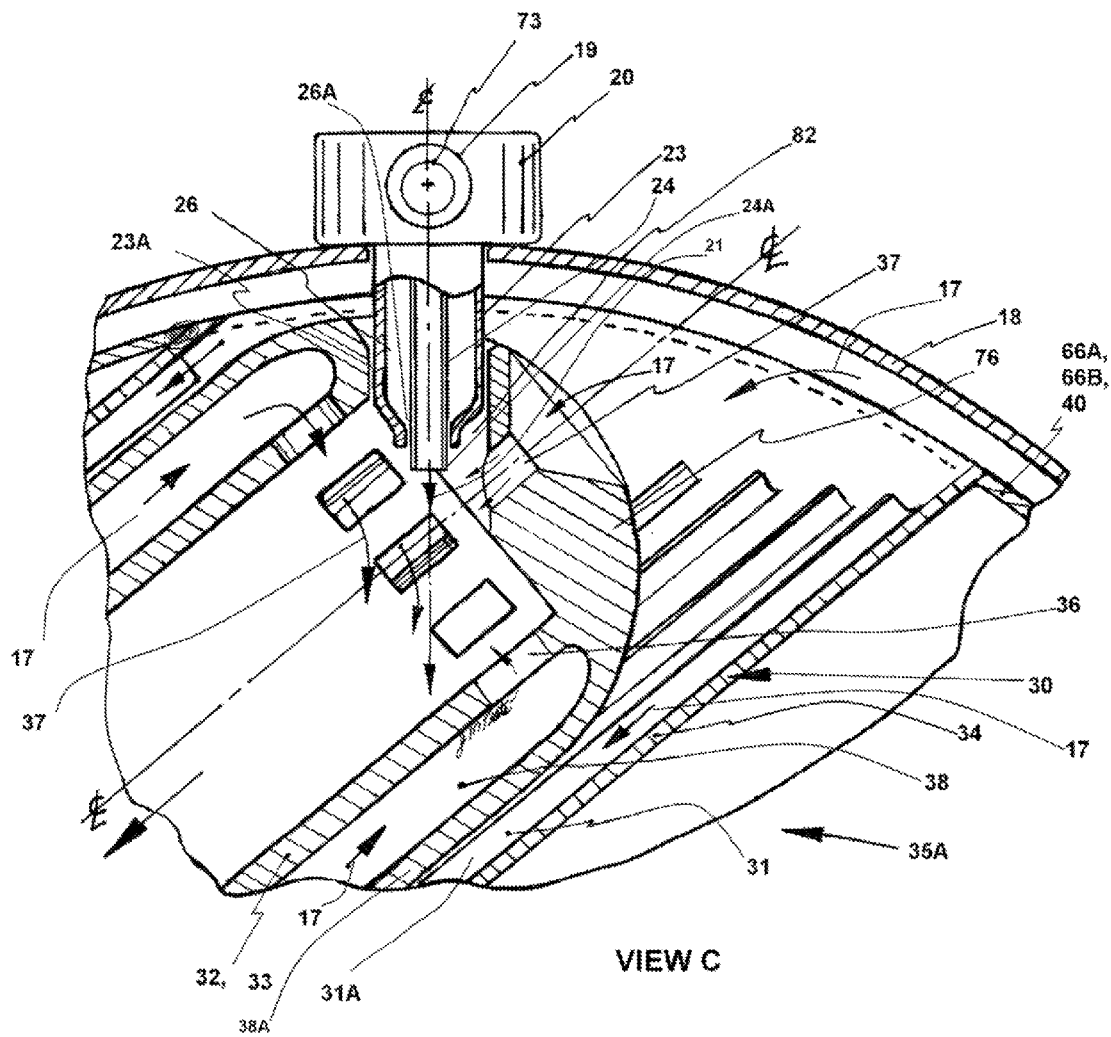
FIG. 7. Partial cross section of a tangential premix/vaporizer chamber with a liquid fuel injector assembly.

The fuel injector assembly 20, FIG. 7 (or a gaseous type 22 of FIG. 6) is a tubular form, and retained to the engine body 18 about the combustor and with a free length is insertable into the F/A premix chamber 30, end cap 76 inner area for delivery of jetted liquid fuel or gaseous type. The inner tube 32 fuel vaporization surface ID, depending on the fuel type, may generate a residual by-product as in the case of diesel fuel type, react/attach to the metal surface, where a ceramic material insertable tube 33 may be incorporated to rid the issue or a coating of zirconium to the tube 32 ID.

Figure 3:
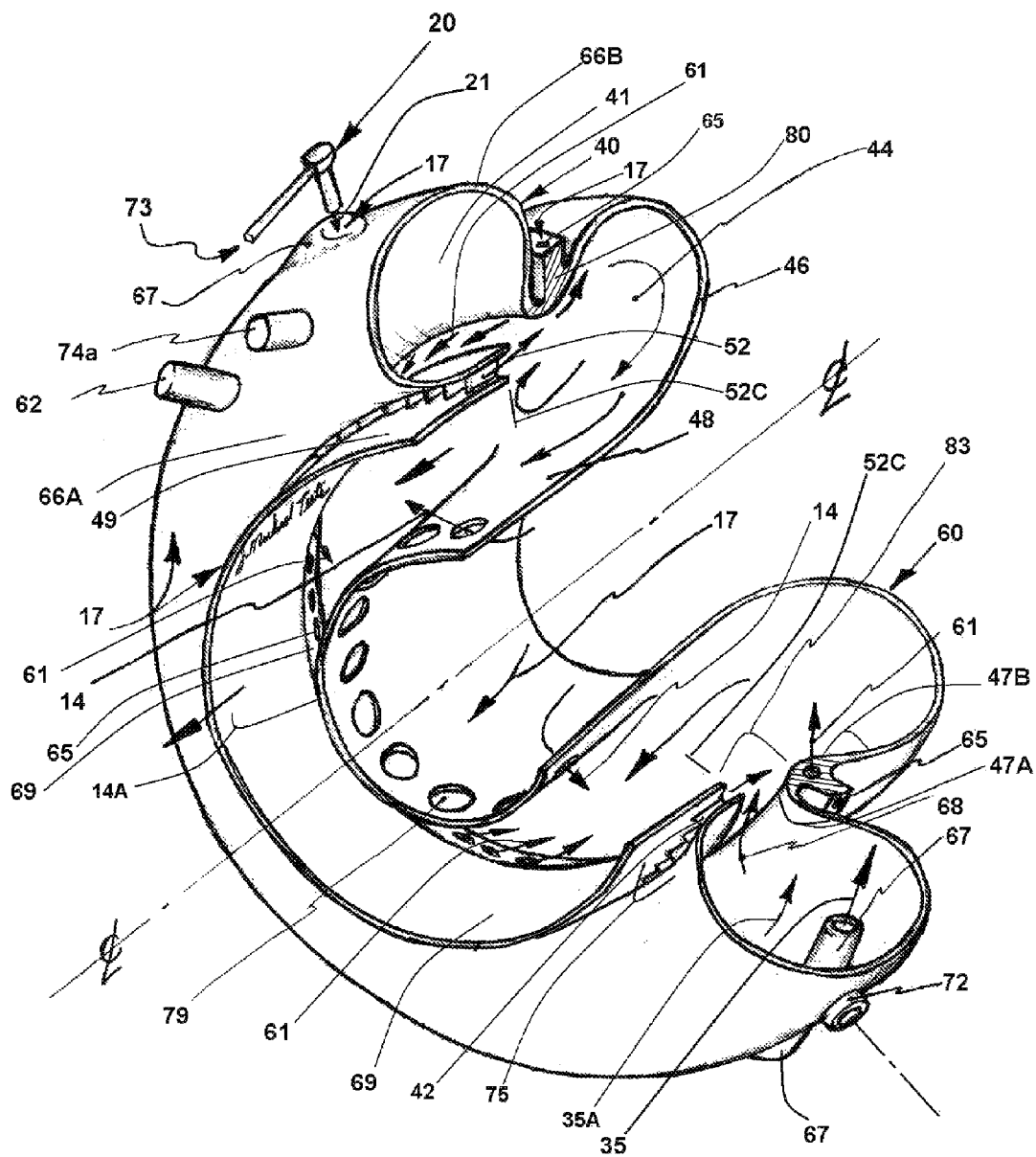
FIG. 3. Orthogonal view of a RQL combustor having two secondary air supplies, ¼ section removed.

A injector heat shield 23 is incorporated about the injector tube 24 with a free axial close fit free floating end 23A for thermal expansion differences, forming a air insulation gap 26 to help keep the tube 24 temperature below −280 F to prevent internal coking of fuel 78 on the inner wall. As another f/a premix tube means simple tubes 76 FIG. 3 are attached tangentially to the primary zone toroidal form 66 to yield a tangential exit f/a flow 35 exiting velocity with resultant circumferential velocity 35A and could be incorporated as a low cost means but be limited in premixing length of ~1.0 inch due to a potential flame on both sides of the metal tube. Like the F/A premix chamber 30, liquid fuel could be jetted to the inner tube wall for thin film dispersion and with a delta liner pressure the air flow 17 would premix with fuel internally within and carried thru by air flow 17 and could have an tube 67 entrance internal coking issue; but more successfully considering gaseous fuels and incorporating injector 22 with exiting longitudinal elongated openings 25. Also as a note, diesel fuels used with material alloy having nickel content, can incur sulfidation at elevated temperatures.

A Rich burn-Quick quench-Lean burn (RQL) combustor that consists of a toroidal form with an approximate round cross sectional area primary combustion zone 41, shell assy. 40 having a front shell 66A and aft shell 66B, and integrated to this primary combustion chambers, radial outboard area, are F/A premix chambers circumferentially disposed with exiting ends having tangentially inboard orientation, an igniter 74a, a secondary air supply outer radial extending ring 80 coaxial to the primary combustion zone 41 and connected to the aft shell 66B inboard end, a secondary combustion zone 44 coaxial to, radially inboard of and aft displaced from the primary combustion zone 41. The secondary combustion zone 44 has an aft end dome 46 with an outboard 47B axial extended length connected to the outboard secondary air supply ring 80 aft end. The gas turbine combustor assembly of this invention like other combustors involves complex combustion dynamics but has evolved in most part by empirical means. Material for this combustor must withstand high temperature environments and at times corrosive elements, say from supplied fuel or atmospheric gases. The combustor liner or shell having inner and outer surfaces needs to have a cooling means and in this invention, uses induced velocity engine compressor air 17 as it is ducted to the designated combustion zones entry areas.

The preferred embodiment is represented in FIG. 3 but incorporates F/A premix chambers 30 in place of the simple tangent tubes 67 and also are circumferentially displaced about the primary zone outer periphery. In operation, a percentage of gas turbine engine compressor 11 discharge air 17 of FIG. 1 is preheated during transition thru the premix assembly 30, being ducted to the inner most central tube 32 FIG. 6, (inboard in end of cap 76), where air ports 36 as a minimum end position are tangential arranged about the tube 32 to supply air tangential 37 to assure no liquid fluid flow stagnation at the beginning of external fuel pressure injector 22 supplied jetted fuel wall dispersion point on wall 32. The air supply channel 38 is preferred to be tangential in order to assure raw liquid fuel flows centrifugally outward to the tube 32 wall for vaporization. The channels 38 although show in one plain could be additional in other planer longitudinal positions displaced axially downstream within the premix vaporizing chamber tube length and still yield a rich fuel/air pre-mixture for primary zone combustion. Also as the fta mixture within the tube 32 becomes flammable in the tube and having no stagnation areas or boundary layer issues, the swirl internal flow velocity will keep the rich flame 35 outboard of the tube exit area 39. The F/A premix chamber 30 outer shell 34 incorporate cooling ribs 31 to preheat the delivered air 37 in transit thru cavities 31 and 38 and at the same time cools the wall 34 and heat the inner tube wall 32 (some fuel coke ~278 F to 800 F, fuel and pressure dependent). An inner tube 32 made from ceramic material could be insertable into 33 to rid any heat issue of an internal flame and or coke-fuel reaction with metal materials and or ash issues. To assure no fuel stagnation at the end of the injector tube detail 24 fuel exiting end during operation and shut down, air port 37 is incorporated in the F/A premix chambers 30 entrance end. In the case of a gaseous fuel 78 injector tube 22, FIG. 6, linear/elongated slots 25 are incorporated to allow better fuel dispersions thru flow area consideration to yield better f/a mixing in the F/A premix chamber 30, inner diameter surface 32. The combustible fuel/air mixture once ignited by an igniter 74 or other means like a "torch" 62, FIG. 3, will supply internal engine heat energy to drive the gas turbine rotor 12 of engine spool 11 FIG. 1. This RQL combustor device offers low emissions, good flame stability at various power loads and or engine speed operating conditions, high combustion efficiency with multifuel usage capability and a uniform flame front to the B turbine. Concerning liquid fuels, diesel fuels more-so than gasoline or Jet fuel, will have a tendency in the primary combustion zone, depending on a f/a mixture, developed internal toroidal fluid flow, and related geometry, to develop light soft carbon. The preferred embodiment is depicted in FIGS. 2, 3, 5, 6, and 7 with FIGS. 1 and 4 as other alternate configurations. FIG. 3 reflects the preferred combustor configuration except with FIG. 2, F/A premix chamber 30 are incorporated. The primary combustion zone 41 FIG. 3, where fuel rich oxidizing combustion takes place, is of a toroidal form 40, having forward shell 66A an aft 66B shell forms and receives a combustible F/A (fuel/Air) mixture with exiting velocity 35 from the F/A premix chamber 30 FIG. 2 simple tangent premix tube or premix/vaporizer assembly 30 of FIG. 2 with an exit 39 of FIG. 2 and is integrated into the primary zone combustion chamber 41, creating an exiting velocity 35 for a circumferential toroidal flow 35A.

The primary combustion zone 41 is of general toroidal geometry 40 and is generally radially outboard of the secondary combustion zone 44 which is of an annular geometry. The secondary combustion zone has an inner annular shell 48 and is connected to an end wall dome shell 46 radially inboard end. The radially outboard end of the shell dome 46 has a longitudinal axial length 47B end which connects to an annular inboard end of ring form 80 which has internal fluid flow channels 65 that direct air flow 17 generally inwardly and circumferentially with discharge air 61 toward the secondary combustion zone 44, thereby intersecting the secondary air discharge flow 51 and flowing into the secondary chamber 44

This outer secondary air supply ring form 80, forward side inboard end is attached to the primary combustion chamber 40 aft dome shell wall 66B at the radially inboard end. The annular reduced area 83 passageway, begins the secondary combustion zone lean-premix-quick-quench premixing area, and is between the primary combustion zone 41 and secondary combustion zone 44 that receives the primary zone rich combusted oxidized gases and mixes with the F/A leaning compressor air 17 that passes thru outboard positioned ring 80, having channels 65, with inward flow 61 and also simultaneously with additional leaning compressor air 17 is supplied thru channels/vanes 42 with axial direction 52 FIG. 3 and or angular 52A FIG. 5.

The combustor liner walls are cooled by a controlled area ducted compressor air flow 17 velocity as it passes thru and to various combustor primary, secondary and dilution air delivery areas; between the combustor shell walls 49, 66A, 66B, 46, 48 and the engine body 18 inner surface. The secondary zone 44 has lean fuel/air combustion and is of an annular form with volume consideration for longer residence time for reduced temperature CO conversion to CO2. The dilution zone 14A, downstream of the secondary combustion zone 45, receives dilution air 14, supplied thru combustor liner 48 openings 79 accepting compressor discharge air 17 to condition the hot combustor gases for the turbine stage requirements. Air 17 can also enter the dilution zone 14A from the annular outer shell 49 from the outer dilution zone duct shell thru holes 81 of FIGS. 1 and 4. The reduced hot gas temperature 46 in the dilution zone 14A is duct transitioned to the turbine nozzle 15 where the hot gas velocity is imparted onto the turbine bladed rotor 12 to cause rotation of spool 10 FIG. 1.

Structurally the combustor can be located and retained with the engine body 18 either by radial extending bolts thru combustor details 72 of FIG. 3 and or using the engine body retained radially positioned and extended fuel injectors assemblies 20, into the injector radially receiver holes 82 or 21 of end sections 76 in the F/A premix 30.

As yet another combustor inventive form, FIG. 4, RQL combustor assembly 40 primary combustion zone shell, like FIG. 1 incorporates a primary combustion zone 41 in a general toroidal geometry form 40. A forward section 66B and an aft section 66B radially positioned outboard of the general axial annular secondary combustion zone 44, having an end dome shell form 46 of the secondary combustion zone shell 60 connecting the inner shell 48 and outer shell 47. This RQL combustor design scheme has secondary leaning mixing air duct 75 channel, vanes 42 to direct generally axially flow 52 or 52A the air 17 to area 83 adjacent to transition shell 74 as a secondary f/a premixing means. The annular transition forms 48 and 49 can have varying annular areas to allow transition of combustor gas to different turbine nozzle locations including one further radially inboard of the secondary zone, inboard of the primary combustion zone. The secondary air flow 52 FIG. 3 can be directed in an axial discharge direction or with an angle circumferentially FIG. 5 52A, governed in part by angle positioning vanes 42. The secondary air flow 52 into the secondary quick quench area adjacent to the upstream of the secondary combustion zone can be controlled by an upstream regulation detail 51, FIG. 4 with retainer means 84 and further enhance cooling of the toroidal liner section by use of flow holes in the plate 51 in close proximity to shell 66A to impinge air 51A onto 66A as it enters the flow transient duct 75.

In summary the aforementioned RQL combustor invention, heat energy device, receives air or oxidant and fuel, stage premixes a combustible f/a mixture and retains a combustion flame; and is generally for use in gas turbine engines to drive a turbine. The engine body having a compressor inlet connected to the compressor housing with a compressor rotor having rotating blades is internal to the engine body with fluid communication with the combustor and the turbine and the turbine rotor having blades has a common spool connection with the compressor. Fuel injectors with a controlled supplied fuel pressure deliver fuel to the premix-vaporizers located internally to the rich f/a primary combustion zone; and attached to the toroidal primary combustor chamber outer shell and positioned tangentially having geometry-length to induce a circumferential combustion flow.

Within the primary combustor chamber an igniter is positioned to ignite the primary chamber delivered premixed combustible mixture from the premix vaporizers. Also, a separate torch supply f/a mixture system could be used to start the combustion process, where at a defined engine speed the f/a mixture from the premix vaporizers could be switched to the main fuel premix primary F/A system. The combusted rich fuel-air mixture is supplied to the radially inboard positioned toroidal geometry shell form, and the outboard of the secondary combustion zone combustor and between the two combustor zones a reduced axial section of axial annular secondary outer liner section receives a secondary air supply to yield a lean secondary f/a combustible mixture.

A flame temperature of ~2500 F is ideal for low NOx and CO simultaneously. NOx although low in this device, like other combustor devices, is a summing species collective from the primary zone and secondary zone. The CO specie with reduced flame temperature below 2500 F requires increased residence time to allow conversion to CO2 for complete combustion. A dilution zone is downstream of the secondary combustion section with correspondingly further compressor supply air in transit to the dilution holes is a liner cooling mean. The dilution zone is connected to the turbine nozzle downstream of the secondary zone to create the desired gas temperature to drive the bladed turbine rotor. The secondary air supply for the quick quench premixing area 83 process with the supplied primary fuel rich combustion gases 83 can be injected with continuous non disruptive flow geometry from an axial supply or in combination with an externally radial channel induced downstream supply; also but not shown in previous figures can be secondary mixing air could be injected axially from two opposing axial displaced circumferential air annulus forms with channel flow. The secondary combustion gases can be ducted axially left, right or radially inboard to the dilution zone and subsequent turbine nozzle and turbine rotor locations.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:
1. A combustor, comprising:
a primary combustion chamber having an exit area;
a secondary combustion chamber having an inlet area, wherein the primary combustion chamber is located radially outboard of the secondary combustion chamber, said primary combustion chamber coupled at an aft end to an end of the secondary combustion chamber;

a reduced combustor flow area disposed between the exit area of said primary combustion chamber and the inlet area of said secondary combustion chamber, said reduced combustor flow area in communication with said primary combustion chamber and said secondary combustion chamber, said reduced combustor flow area adapted for receipt of rich combusted oxidized gases exiting the primary combustion chamber where the rich combusted oxidized gases will be conditioned before they enter the secondary combustion chamber;

an annular ring extending radially outward from a wall of the secondary combustion chamber and having a plurality of passageways in communication with the reduced combustor flow area, wherein said passageways adapted for permitting a first amount of compressor air to pass through said annular ring for mixing with the rich combusted oxidized gases entering in the reduced combustor flow area as part of conditioning the rich combusted oxidized gases; and an annular channel in communication with the reduced combustor flow area, wherein said annular channel adapted for permitting a second amount of compressor air to pass into the reduced combustor flow area for mixing with rich combusted oxidized gases entering in the reduced combustor flow as part of conditioning the rich combusted oxidized gases.

2. The combustor of claim 1 wherein said annular ring positioned at a first side of the reduced combustor flow area and said annular channel substantially disposed at an opposite second side of the reduced combustor flow area.

3. The combustor of claim 1 wherein said primary combustion chamber having a toroidal geometric shape.

4. The combustor of claim 1 wherein said annular channel having a plurality of angle positioning vanes for directing a travel angle for the second amount of compressor air into the reduced combustor flow area.

5. The combustor of claim 1 wherein the reduced combustor flow area is an annular reduced combustor flow area.

6. The combustor of claim 1 wherein said reduced combustor flow area defining a quick quench area for simultaneous mixing of the rich combusted oxidized gases with the first amount of compressor air and the second amount of compressor air resulting in a premix of conditioned gases prior to the premix of conditioned gases entering the secondary combustion chamber.

7. The combustor of claim 1 further comprising a dilution zone positioned downstream from the secondary combustion chamber, said dilution zone having a plurality of openings for accepting a third amount of compressor air for conditioning secondary combustor gases exiting the secondary combustion chamber.

8. The combustor of claim 3 wherein the toroidal shape of the primary combustion chamber provides for a toroidal circumferential flow to keep unburned fuel outboard of the exit area of the primary combustion chamber.

9. A combustor, comprising:

a primary combustion chamber having a toroidal geometric shape and an exit area;

a secondary combustion chamber having an inlet area, said primary combustion chamber located radially outboard of the secondary combustion chamber, said primary combustion chamber coupled at an aft end to an end of the secondary combustion chamber;

an annular reduced combustor flow area disposed between the exit area of said primary combustion chamber and the inlet area of said secondary combustion chamber, said reduced combustor flow area in communication with said primary combustion chamber and said secondary combustion chamber, said reduced combustor flow area adapted for receipt of rich combusted oxidized gases exiting the primary combustion chamber where the rich combusted oxidized gases will be conditioned before they enter the secondary combustion chamber;

an annular ring extending radially outward from a wall of the secondary combustion chamber and positioned at a first side of the reduced combustor flow area, said annular ring having a plurality of passageways in communication with the reduced combustor flow area, wherein said passageways adapted for permitting a first amount of compressor air to pass through said annular ring for mixing with the rich combusted oxidized gases entering in the reduced combustor flow area as part of conditioning the rich combusted oxidized gases; and an annular channel disposed at an opposite second side of the reduced combustor flow area from said annular ring, said annular channel in communication with the reduced combustor flow area, wherein said annular channel adapted for permitting a second amount of compressor air to pass into the reduced combustor flow area for mixing with rich combusted oxidized gases entering in the reduced combustor flow as part of conditioning the rich combusted oxidized gases;

wherein the toroidal shape of the primary combustion chamber provides for a toroidal circumferential flow to keep unburned fuel outboard of the exit area of the primary combustion chamber;

wherein said reduced combustor flow area defining a quick quench area for simultaneous mixing of the rich combusted oxidized gases with the first amount of compressor air and the second amount of compressor air resulting in a premix of conditioned gas prior to the premix of conditioned gases entering the secondary combustion chamber.

10. The combustor of claim 9 wherein said annular channel having a plurality of angle positioning vanes for directing a travel angle for the second amount of compressor air into the reduced combustor flow area.

11. The combustor of claim 9 further comprising a dilution zone positioned downstream from the secondary combustion chamber, said dilution zone having a plurality of openings for accepting a third amount of compressor air for conditioning secondary combustor gases exiting the secondary combustion chamber.

* * * * *